U S008494517B2

(12) United States Patent
Awad et al.

(10) Patent No.: US 8,494,517 B2
(45) Date of Patent: Jul. 23, 2013

(54) CONTROL CHANNEL COMMUNICATIONS IN A CELLULAR COMMUNICATIONS NETWORK

(75) Inventors: Yassin Aden Awad, Tokyo (JP); Jagdeep Singh Ahluwalia, Tokyo (JP)

(73) Assignee: NEC Corporation, Tokyo (JP)

( * ) Notice: Subject to any disclaimer, the term of this patent is extended or adjusted under 35 U.S.C. 154(b) by 292 days.

(21) Appl. No.: 12/451,072

(22) PCT Filed: Apr. 30, 2008

(86) PCT No.: PCT/JP2008/058594
§ 371 (c)(1),
(2), (4) Date: Oct. 26, 2009

(87) PCT Pub. No.: WO2008/140029
PCT Pub. Date: Nov. 20, 2008

(65) Prior Publication Data
US 2010/0120423 A1    May 13, 2010

(30) Foreign Application Priority Data
May 1, 2007    (GB) .................................. 0708456.9

(51) Int. Cl.
*H04W 4/00*    (2009.01)
*H04W 72/00*    (2009.01)

(52) U.S. Cl.
USPC ........................................ 455/434; 455/452.1

(58) Field of Classification Search
USPC .......................... 455/434; 370/310, 328, 468
See application file for complete search history.

(56) References Cited

U.S. PATENT DOCUMENTS

| 6,456,627 | B1 | 9/2002 | Frodigh et al. | |
|---|---|---|---|---|
| 2005/0007968 | A1* | 1/2005 | Hsu et al. | 370/310 |
| 2006/0018347 | A1 | 1/2006 | Agrawal | |
| 2007/0248041 | A1* | 10/2007 | Seki | 370/328 |
| 2009/0103562 | A1* | 4/2009 | Frederiksen et al. | 370/468 |

FOREIGN PATENT DOCUMENTS

| EP | 1 835 631 A | | 9/2007 |
|---|---|---|---|
| WO | WO 99/12281 | | 3/1999 |
| WO | WO 2006/022876 | * | 3/2006 |
| WO | WO 2006/022876 A1 | | 5/2006 |
| WO | WO2006/070466 A1 | | 7/2006 |
| WO | WO 2006/132247 A1 | | 12/2006 |

OTHER PUBLICATIONS

Japanese Office Action dated Mar. 28, 2012.

(Continued)

*Primary Examiner* — Michael Faragalla
(74) *Attorney, Agent, or Firm* — McGinn IP Law Group, PLLC

(57) ABSTRACT

A communications device in the form of a base station or communications node such as an eNodeB communications node selects one of a plurality of modulation and coding schemes for a control channel for a user communications device on the basis of the range which is specified by the location or channel condition within a cell of the user communications device. The selected modulation and coding scheme are identified to the user communications device separately from the control channel. In one example, the selected modulation and coding scheme is identified to the user communications device by way of a 2-bit code which may be provided within a MAC control block or appended to a MAC Data PDU.

20 Claims, 5 Drawing Sheets

OTHER PUBLICATIONS

Nokia, Tree Structure for the DL Control Channel, 3GPP TSG-RAN WG1 Meeting #48bis R1-071683, http://www.3gpp.org/ftp/tsg_ran/WG1_RL1/TSGR1_48b/Docs/R1-071683.zip.

NEC, Signaling change of MCS of DL Control Channel, 3GPP TSG WG2#58bis Meeting R2-072517, http://www.3gpp.org/ftp/tsg_ran/WG2_RL2/TSGR2_58bis/Docs/R2-072517.zip.

* cited by examiner

CONTROL CHANNEL COMMUNICATIONS IN A CELLULAR COMMUNICATIONS NETWORK

FIELD OF THE INVENTION

The present invention relates to control channel communications in a cellular communications network between a communications node or base station and any user equipment (UE) within the communications node's cell. The invention has particular although not exclusive relevance to downlink (DL) control channels for the Long Term Evolution (LTE) of UTRAN (called Evolved Universal Radio Access Network (E-UTRAN)).

BACKGROUND ART

In cellular (mobile) telecommunications networks, the ability of a communications node to communicate over a downlink control channel with each UE within its cell is determined by the signal-to-noise ratio on the channel which is related to the range of the UE from the base station.

In order to address this issue, it has been proposed for 3GPP to have multiple Modulation and Coding Schemes (MCS) for the layer L1-layer L2 control structure with the MCS selected by the communications node for a downlink control channel to UE being determined by the range of the UE from the communications node at that time. In this particular proposal, the communications node cell is divided into a number of communication regions of successively greater range from the communications node and each communication region is allocated a particular Modulation and Coding Scheme so that the MCS selected for a particular UE will depend upon the communications region within which the UE is situated at that particular time. FIG. 4 of the accompanying drawings illustrates the MCSs to be employed for the Long Term Evolution (LTE) of UTRAN. In this example, four communications regions are provided defined by successive concentric circles. As proposed, all of the MCSs use the same modulation type, QPSK (Quadrature Phase Shift Key), but have different coding rates. In the example shown in FIG. 4, the innermost or first communications region has a coding rate of 2/3, the next or second communications region has a coding rate of 1/3, the third communications region has a coding rate of 1/6 and the fourth or outermost communications region has a coding rate of 1/12. A communications node may thus apply adaptive coding for the DL control channel for a UE, depending upon the communications region in which UE is present at any given time.

The transmission bandwidth available for control channels is divided into a number of control channel elements. A control channel consists of one or more logical control channel elements (CCEs) where a CCE consists of a number, for example 12, of resource elements or sub-carriers. Thus, the smallest control channel consists of a single CCE and larger control channels can be formed by aggregating multiple CCEs.

The downlink (DL) and uplink (UL) control channels may thus be formed from one, two, three, four or more CCEs, depending on the required payload for the control channel. The coding rate of the MCS affects the payload and thus the required number of aggregated control channels. Where multiple MCSs are used, the number of control channel elements aggregated to form the control channel will differ from communications region to communications region. Accordingly, UE may have to search all the different aggregate combinations to find its control channel from the base station.

DISCLOSURE OF THE INVENTION

According to one aspect of the present invention, there is provided a method of control channel communication within a cellular communications network, the method comprising: determining data relating to the range of a communications device within a cell of the cellular network; selecting one of a plurality of modulation and coding schemes (MCS) for a control channel for that communications device on the basis of the determined range data; identifying the selected MCS to the communications device separately from the control channel; and providing a control channel for that communications device using the selected MCS.

According to another aspect of the present invention, there is provided a communications device comprising: a determiner to determine data relating to the range of a user communications device within a cell of a cellular network; a selector to select one of a plurality of modulation and coding schemes for a control channel for that user communications device on the basis of the determined range data; an identifier to separately identify the selected modulation and coding scheme to the user communications device; and a provider to provide a control channel for that user communications device using the selected modulation and coding scheme.

According to another aspect of the present invention, there is provided a method of communicating in a cellular communications network, the method comprising a user communications device: receiving from a communications node identification data identifying one of a plurality of modulation and coding schemes for a control channel for the user communications device; and identifying the control channel using the received identification data identifying one of a plurality of modulation and coding schemes for the control channel.

According to another aspect of the present invention, there is provided a user communications device for use in a cellular communications network, the user communications device comprising: a receiver to receive from a communications node identification data identifying one of a plurality of modulation and coding schemes for a control channel for the user communications device; and an identifier to identify the control channel using the received identification data identifying one of a plurality of modulation and coding schemes for the control channel.

An embodiment of the present invention enables a modulation and coding scheme for a control channel for a particular user communications device to be selected by a base station or communications node in accordance with the range of the user device while still allowing the user communications device to determine its control channel relatively easily. In contrast, if the modulation and coding scheme had been unknown to the user communications device, the user communications device may have had to check each and every possible combination of aggregated control channel elements for the sub-set of sub-carriers that it is monitoring to find its control channel, i.e. blind decoding. This blind decoding increases the processing/complexity at the UE.

The selected MCS may be identified to the user communications device using a higher communications protocol layer, for example using the L2 layer.

The selected MCS may be identified to the user communications device through a control message. The selected MCS may be identified by a 2-bit code. The selected MCS may be identified within a MAC control block or in data appended to a MAC Data PDU.

The plurality of modulation and coding schemes may each have a different coding rate.

In an embodiment, each MCS has a different coding rate and the control channel consists of an aggregate of a number of control channel elements each consisting of a number of resource elements with the aggregate number of control elements in the control channel depending upon the MCS.

The plurality of modulation and coding schemes may each use the same modulation scheme. The plurality of modulation and coding schemes may each use either a Quadrature Phase Shift Key (QPSK) or a Binary Phase Shift Key (BPSK) modulation scheme.

In an embodiment, determining data relating to the range of a user communications device within the cell of the communications device comprises determining which of a number of communications regions successively further from the communications device the user communications device is in. In an embodiment, each communications region is associated with a respective different one of the modulation and coding schemes.

In an embodiment, a communications device in the form of a base station or communications node such as an eNodeB communications node selects one of a plurality of modulation and coding schemes for a control channel for a user communications device on the basis of the range of that user communications device within its cell and identifies the selected modulation and coding scheme to the user communications device separately from the control channel. In one example, the selected modulation and coding scheme is identified to the user communications device by way of a 2-bit code which may be provided within a MAC control block or appended to a MAC Data PDU.

In an embodiment, the range of a user communications device may be determined on the basis of at least one of: the actual distance of the user communications device from the communications device; an average SNR (signal to noise ratio); a channel quality indicator (CQI). The range of a user communications device may thus be greater or less than its actual distance from the base station if the channel quality indicator (CQI) indicates a poor or good channel condition.

BEST MODE FOR CARRYING OUT THE INVENTION

An embodiment of the present invention will now be described with reference to the drawings. Although for efficiency of understanding for those of skill in the art the description will be in the context of a 3G system, the principles can be applied to other cellular communications systems, e.g. other CDMA or wireless systems in which a mobile device or User Equipment (UE) communicates with one of several other devices (corresponding to eNodeB) with the corresponding elements of the system changed as required.

Figure 1:
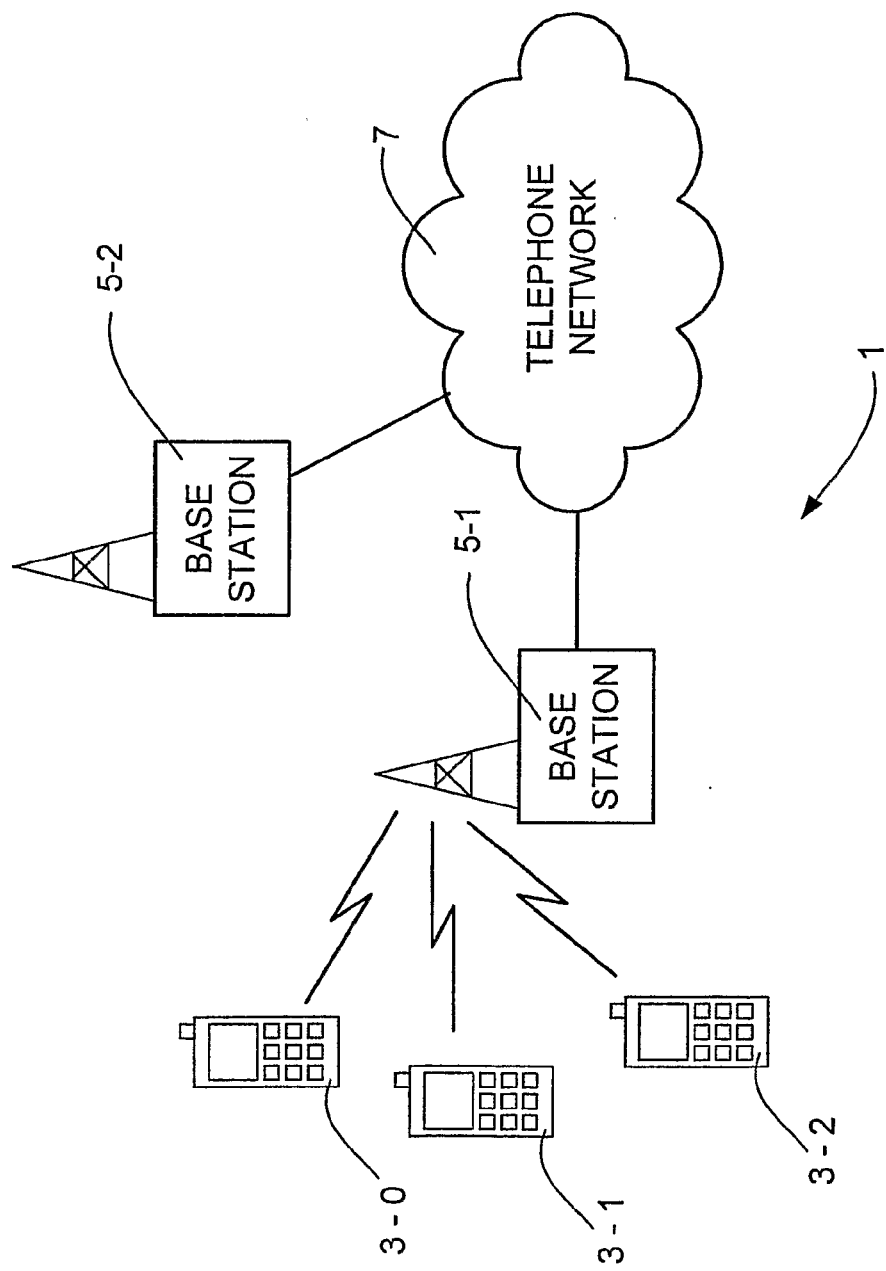
FIG. 1 illustrates schematically a mobile telecommunication system of a type to which an embodiment of the present invention may be applied.

By way of overview, FIG. 1 illustrates schematically a mobile (cellular) telecommunications system 1 in which users of user equipment (UE) (which may be mobile (cellular) telephones or other cellular telecommunications equipped devices) 3-0, 3-1, and 3-2 can communicate with other users (not shown) via base stations or communications nodes 5-1 or 5-2 and a telephone network 7. In this embodiment, the base stations 5 use an orthogonal frequency division multiple access (OFDMA) technique to transmit data on the downlink (DL) to each UE 3 while each UE 3 uses a single carrier frequency division multiple access (FDMA) technique to transmit data on the uplink (UL) to the base stations 5. The base stations 5 allocate different sub-carriers to each UE 3 depending on the supported bandwidth of the UE 3 and the amount of data to be sent to/from the UE 3.

In this embodiment, the available transmission bandwidth is divided into a number of resource blocks, each of which comprises a number of contiguous sub-carriers. Different UE 3 is allocated different resources block(s) (sub-carriers) within the whole bandwidth for transmitting their data.

Figure 2:
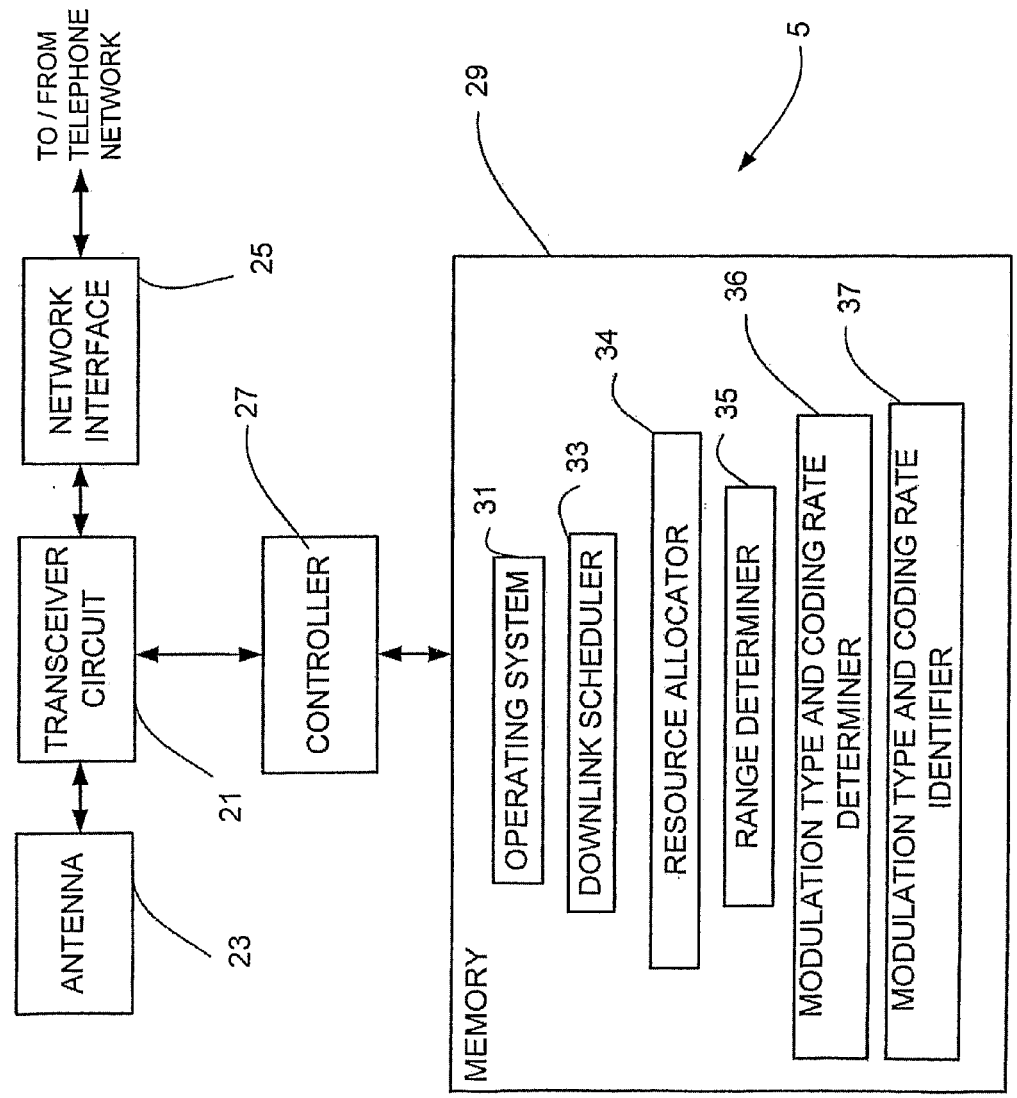
FIG. 2 illustrates schematically a communications node or base station of the system shown in FIG. 1.

FIG. 2 shows a block diagram illustrating the main components of a base station 5, that is, an eNodeB communications node in the 3G system being described. As shown in FIG. 2, each base station 5 includes a transceiver circuit 21 to transmit signals to and to receive signals from each UE 3 via one or more antennae 23 (using the above described sub-carriers) and to transmit signals to and to receive signals from the telephone network 7 via a network interface 25. The transceiver circuit 21 is controlled by a controller 27 in accordance with software stored in memory 29. The software includes, among other things, an operating system 31, a downlink scheduler 33 to schedule user data packets to be transmitted by the transceiver circuit 21 in communications with each UE 3 and a resource allocator 34 to allocate frequency resources for use by each UE 3 for transmitting their uplink data to the base station 5. In this example, the software includes a range determiner 35 to determine the range of UE from the base station, a modulation type and coding rate (MCS) determiner 36 to determine the modulation and coding rate to be used, and a modulation type and coding rate scheme (MCS) identifier 37 to identify to each UE 3 the MCS of a control channel upon which the base station is attempting to communicate with the UE 3.

Figure 3:
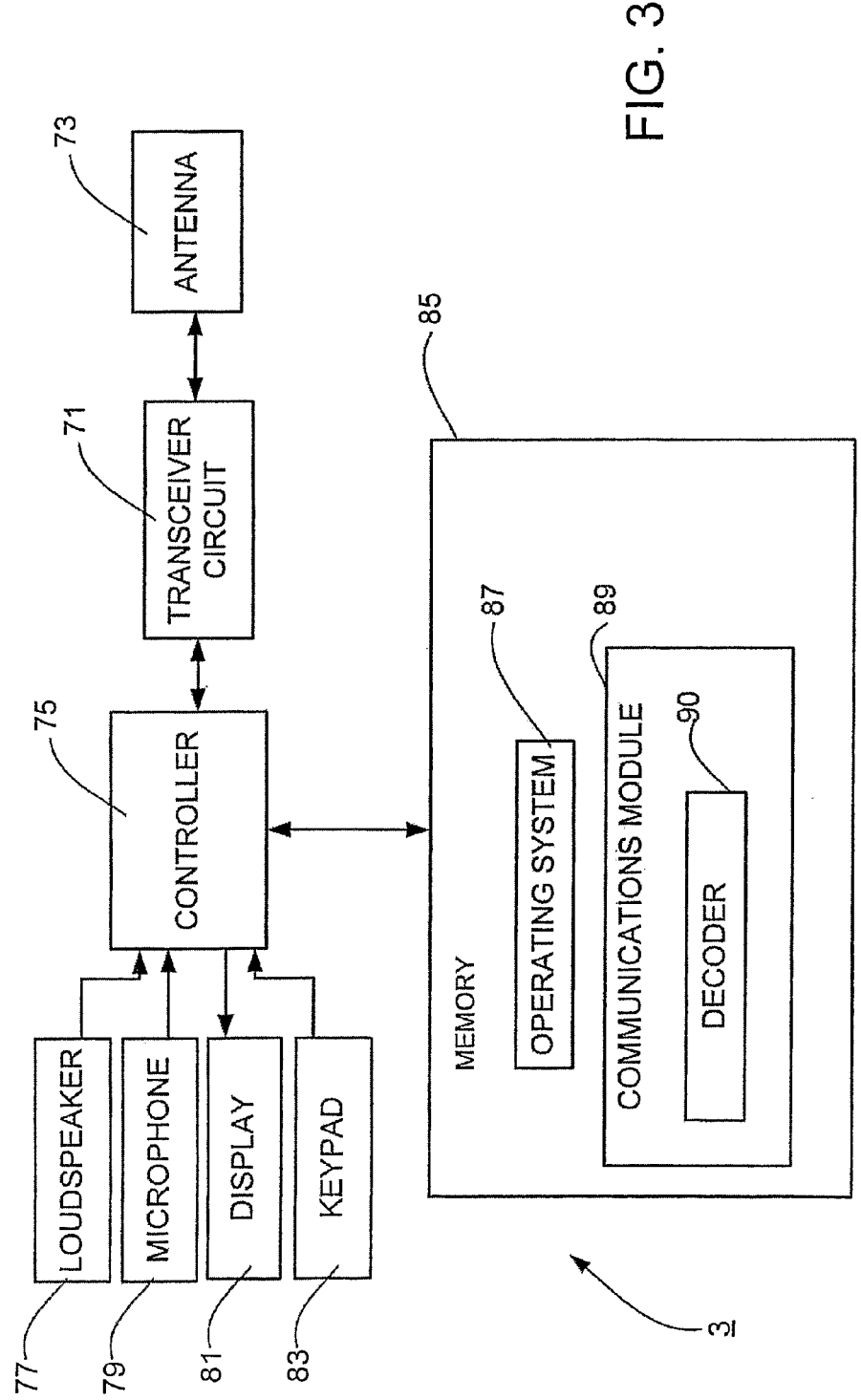
FIG. 3 illustrates schematically a mobile communication device or user equipment (UE) of the system shown in FIG. 1.

FIG. 3 illustrates schematically the main components of UE 3 shown in FIG. 1. As shown in FIG. 3, each UE 3 includes a transceiver circuit 71 to transmit signals to and to receive signals from the base station 5 via one or more antennae 73. As shown, the UE 3 also includes a controller 75 to control the operation of the UE 3. The controller 75 is connected to the transceiver circuit 71 on one hand and to a loudspeaker 77, a microphone 79, a display 81, and a keypad 83 on the other hand. The controller 75 operates in accordance with software instructions stored within memory 85. As shown, these software instructions include, among other things, an operating system 87 and a communications module 89 having a decoder to perform decoding on a downlink (DL) control channel.

It should of course be appreciated that, although not explicitly shown in FIGS. 2 and 3, the base stations 5 and UE 3 will have all of the functionality necessary to enable them to operate as base stations and UEs, respectively, in the particular system in which they are designed to function. It should also be appreciated that FIGS. 2 and 3 are functional block diagrams and that in practice the individual blocks shown in FIGS. 2 and 3 may exist as discrete elements or their functionality may be distributed or not individually discernable. As an example, the range determiner 35, the MCS determiner 36 and MCS identifier 37 may or may not be separate software modules and may or may not be provided within the resource allocator functionality.

Although the above description of FIGS. 2 and 3 indicates that the described functionality is provided by software, it should be appreciated that the functionality of UE or base station may be provided, where appropriate, by hardware, software, firmware or any combination thereof. As an example, the functionality performed by part or all of the above-described software may be performed using one or more dedicated hardware circuits. A software implementation may however be preferred to facilitate the updating of the functionality of a base station 5 or UE 3.

Where software modules are provided, they may be provided, as appropriate, in compiled or un-compiled form and may be supplied to the base station or to the UE, as the case may be, as a signal over a computer or telecommunications network, or on a computer storage medium.

The operation of a base station 5 and UE 3 in the implementation of an embodiment of the present invention will now be described with the aid of FIGS. 2 to 5.

The base stations 5 and each UE 3 implement multiple Modulation and Coding Schemes (MCS) for the layer L1-layer L2 control structure. In this example, the cell of a base station 5 is divided into a number of communication regions of successively greater range from the base station 5 and each communication region is allocated a particular Modulation and Coding Scheme (MCS). In this example, the MCSs all use the same modulation type QPSK (Quadrature Phase Shift Key) but have different coding rates.

Figure 4:
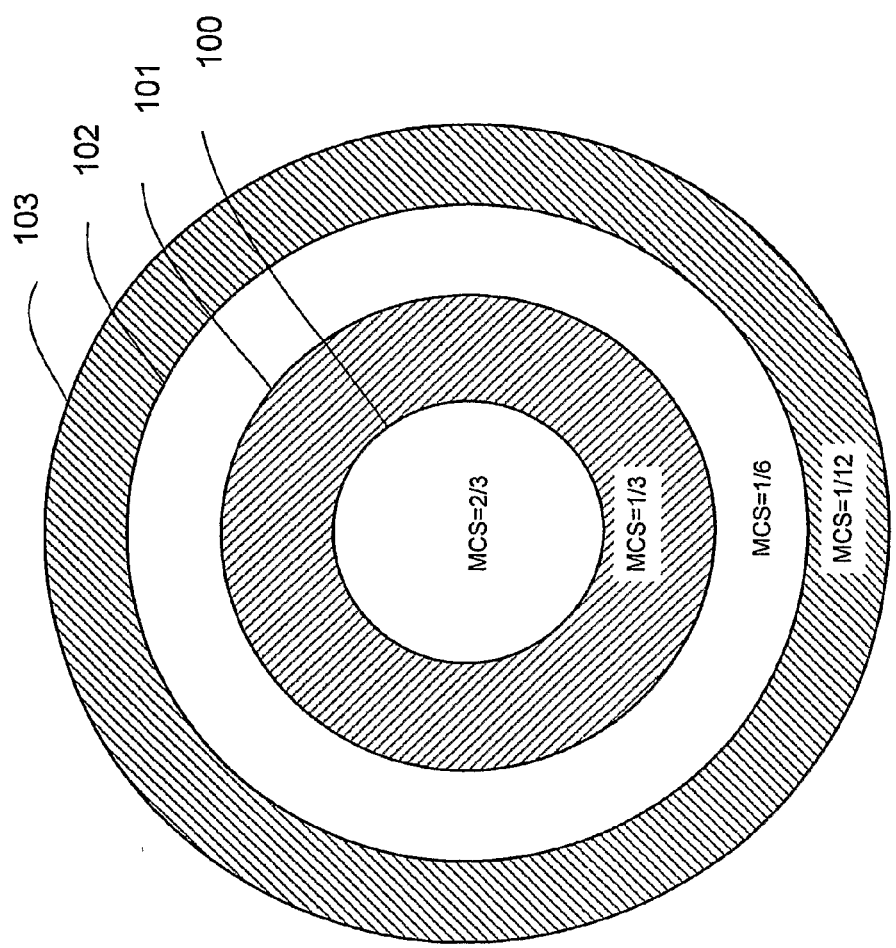
FIG. 4 shows a diagram for explaining variation of modulation and coding schemes with UE range.
Figure 5A:
FIGS. 5a to 5d show diagrams for illustrating blind decoding on a downlink control channel by a UE.
Figure 5B:
Figure 5C:
Figure 5D:

FIG. 4 shows a representation of base station cell coverage showing the MCS to be employed for the DL control channel in LTE. In the example illustrated by FIG. 4, four concentric successively distant communications regions 100, 101, 102 and 103 are provided with their boundaries defined by successive concentric circles. The circular innermost or first communications region 100 shows the coverage for a DL control channel with a coding rate of 2/3, the annular next or second communications region 101 shows the coverage for a DL control channel with a coding rate of 1/3, the annular third communications region 102 shows the coverage for a DL control channel with a coding rate of 1/6 and the annular fourth or outermost communications region 103 shows the coverage for a DL control channel with a coding rate of 1/12.

The communications node or base station 5 applies adaptive coding for the DL control channel for a UE depending upon the communication region in which that UE 3 is present at any given time.

The range determiner functionality of a base station 5 determines the range of UE 3 during or after the initial handshaking procedure. The effective range of a UE 3 may, for example, be determined by the range determiner on the basis of the actual distance of the UE from the base station, or may be determined on the basis of an average SNR or channel quality indicator (CQI) so that the effective range of UE may be greater or less than its actual distance from the base station if the channel quality indicator (CQI) indicates a poor or good channel condition.

Once the range determiner 35 has determined the range of the UE 3, the range determiner determines which of the communications regions 100 to 103 the UE 3 is in, enabling the MCS determiner 36 to determine the MCS to be used on the basis of, for example, a table in memory relating communication region to MCS. In the present example as the modulation type is the same for all MCS, the table may simply relate the communications regions to the associated coding rates. In the present example, the communications regions 100, 101, 102 and 103 are associated with coding rates of 2/3, 1/3, 1/6 and 1/12, respectively as shown in FIG. 4.

The base station 5 provides a downlink control channel to the UE 3 using the determined MCS and signals MCS identity data identifying the determined MCS to the UE 34 in a higher communications protocol layer, in this example the L2 layer. The UE 3 stores in memory the MCS (or in this example the coding rates as the modulation type is the same for all communications regions) with the corresponding aggregated number of CCEs required for the downlink control channel. The UE 3 can thus determine from the MCS identity data the number of aggregated CCEs it should expect in its downlink control channel thus, as will be explained below, reducing the complexity of the search required by the UE 3 for its downlink control channel from the base station 5.

The change in MCS together with other control channel parameters, such as the subset of CCEs to be monitored by the UE 3 etc. can be signaled to the UE by the base station through a MAC control block which consists of a control header and control message contents field that enables MAC control messages to be transported within the MAC control blocks. In the present example, the DL control channel MCS may be encoded using a 2-bit field within the control message as indicated in Table 1.

TABLE 1

| DL control channel MCS field definition | |
|---|---|
| DL control channel MCS Type field 2 bits | MCS Type |
| 00 | 2/3 |
| 01 | 1/3 |
| 10 | 1/6 |
| 11 | 1/12 |

As another possibility, the change in MCS may be appended to MAC Data PDU (Protocol Data Unit). If the DL control channel MCS is appended to the MAC PDU, then a header field will indicate that the control information is appended to the MAC PDU.

To enable the base station or eNodeB (eNB) 5 to ensure that a packet carrying a MAC control message is received without error to avoid mismatch of the MCS between the UE and the base station, the UE 3 sends an acknowledgement message to the base station 5 using, in this example, HARQ (Hybrid Automatic Repeat request) L1/L2 procedures.

The advantages of signaling the MCS to the UE 3 where multiple MCS are possible will now be explained.

The downlink (DL) and uplink (UL) control channels are formed from one, two, three, four or more logical control channel elements (CCEs) where a CCE consists of a number of resource elements, in this example 12. The aggregated number of CCEs depends on the required payload for each control channel and the coding rate of the MCS affects the payload and thus the required number of CCEs.

Table 2 below shows the aggregation of CCEs to provide the DL and UL control channels for a 5 Mhz (Mega Hertz) bandwidth for different MCS coding rates.

TABLE 2

| | MCS (i.e. coding rate) | | | |
|---|---|---|---|---|
| | 2/3 | 1/3 | 1/6 | 1/12 |
| UL | 2CCE | 4CCE | 8CCE | 16CCE |

TABLE 2-continued

| | MCS (i.e. coding rate) | | | |
|---|---|---|---|---|
| | 2/3 | 1/3 | 1/6 | 1/12 |
| DL | 3CCE | 6CCE | 12CCE | 24CCE |

Thus in this example, the downlink control channel is aggregated from 3 CCEs, 6 CCEs, 12 CCEs and 24 CCEs, respectively, for coding rates of 2/3, 1/3, 1/6 and 1/12 and the uplink control channel is aggregated from 2 CCEs, 4 CCEs, 8 CCEs and 16 CCEs, respectively, for coding rates of 2/3, 1/3, 1/6 and 1/12.

As explained above, the MCS being used by the base station for the DL control channel is signaled separately to the UE 3 (for example in the L2 layer) and accordingly the decoder 90 of the UE 3 is able relatively easily to identify and then decode its downlink control channel because the UE 3 knows the CCE aggregation of the downlink control channel from the signaled MCS.

The advantages of signaling the MCS to the UE 3 can best be seen by contrasting this with the case where the MCS is unknown to the UE 3 and the UE 3 has to perform blind decoding on the control channel. Accordingly, an example will now be described in which the UE 3 expects separate DL and UL control channels in the 5 MHz bandwidth, the subset of control channel elements (CCEs) to be monitored by the UE is 16 for the uplink and 24 for the downlink.

Where the base station is using a MCS with a coding rate of MCS=1/3 for both DL and UL control channels, then as shown in Table 2: 1) for the UL control channel when the MCS is not signaled to the UE 3 (that is it is unknown to the UE), an aggregation of 2 CCEs, 4 CCEs, 8 CCEs, or 16 CCEs is possible corresponding to a coding rate of 2/3, 1/3, 1/6 or 1/12, respectively, while when the MCS is signaled to the UE 3, the aggregation is known by the UE 3 to be 4 CCEs corresponding to a coding rate of 1/3; and 2) for the DL control channel when the MCS is not signaled to the UE (that is it is unknown to the UE), aggregations of 3 CCEs, 6 CCEs, 12 CCEs, and 24 CCEs are possible corresponding to coding rates of 2/3, 1/3, 1/6 and 1/12, respectively, while when the MCS is signaled to the UE, the aggregation is known by the UE 3 to be 6 CCEs corresponding to a coding rate of 1/3.

Where the base station is using a MCS with a coding rate of MCS=1/6 for both DL and UL control channels, then as shown in Table 2: 1) for the UL control channel when the MCS is not signaled to the UE (that is it is unknown to the UE 3), aggregations of 2 CCEs, 4 CCEs, 8 CCEs, or 16 CCEs are possible corresponding to coding rates of 2/3, 1/3, 1/6 and 1/12, respectively, while when the MCS is signaled to the UE 3, the aggregation is known by the UE 3 to be 8 CCEs corresponding to a coding rate of 1/6; and 2) for the DL control channel when the MCS is not signaled to the UE (that is it is unknown to the UE), aggregations of 3 CCEs, 6 CCEs, 12 CCEs, or 24 CCEs are possible corresponding to coding rates of 2/3, 1/3, 1/6 and 1/12, respectively, while when the MCS is signaled to the UE, the aggregation is known by the UE 3 to be 12 CCEs corresponding to a coding rate of 1/6.

FIG. 5 illustrates the CCE aggregations for these different coding rates for the uplink control channel. Different hatching styles are used in FIG. 5 to indicate the aggregations of CCEs. Thus FIG. 5a shows the aggregating of 2 CCEs (CCE1 and CCE2; CCE3 and CCE4; CC5 and CCE6; CCE7 and CCE 8; . . . CCE15 and CCE16) for a coding rate of 2/3 while FIG. 5b shows the aggregating of 4 CCEs (CCE1, CCE2, CCE3 and CCE4; CC5, CCE6, CCE7 and CCE 8; and so on) for a coding rate of 1/3, while FIG. 5c shows the aggregating of 8 CCEs (CCE1, CCE2, CCE3, CCE4, CC5, CCE6, CCE7 and CCE 8; and so on) for a coding rate of 1/6 and FIG. 5d shows the aggregating of 16 CCEs (CCE1 and CCE2, CCE3 and CCE4, CC5 and CCE6, CCE7, CCE 8, . . . CCE15 and CCE16) for a coding rate of 1/12

Where the MCS is not known to the UE 3, the UE 3 has to search or test each CCE aggregate possibility one at the time because the different coding rates have different payloads resulting different number of CCEs to aggregate.

Table 3 below contrasts the possible maximum number of decoding attempts where the MCS is unknown and where the MCS is signaled to the UE 3, for both the uplink and downlink control channels for MCS coding rates of 1/3 and 1/6. The maximum number of decoding attempts (trials or tests) represents the worst case scenario where the actual DL control channel is provided by the last aggregate of CCEs tested by the UE 3 or the UE 3 does not find a DL control channel.

TABLE 3

| | MCS = 1/3 | | MCS = 1/6 | |
|---|---|---|---|---|
| | MCS unknown | MCS known | MCS unknown | MCS known |
| Number of decoding attempts for the UL Scheduling assignment | 8 + 4 + 2 + 1 = 15 | 4 | 8 + 4 + 2 + 1 = 15 | 2 |
| Number of decoding attempts for the DL Scheduling assignment | 8 + 4 + 2 + 1 = 15 | 4 | 8 + 4 + 2 + 1 = 15 | 2 |

Thus, for the uplink control channel (for which the UE monitors a sub-set of 16 CCEs), then if the MCS is unknown to the UE 3, the UE 3 may, in the worst case, have to make up to 15 tests or decoding attempts (that is tests on eight aggregates of two CCEs (CCE1 and CCE2; CCE 3 and CCE4; CCE 5 and CCE6; and so on in FIG. 5) assuming a coding rate of 2/3, tests on four aggregates of four CCEs (CCE1, CCE2, CCE 3 and CCE4; CCE 5, CCE6, CCE 7 and CCE 8; and so on . . . in FIG. 5) assuming a coding rate of 1/3, tests on two aggregates of eight CCEs assuming a coding rate of 1/6, and a test on one aggregate of 16 CCEs assuming a coding rate of 1/12). In contrast where the MCS is signaled to the UE 3 as being 1/3, the decoder 90 only has to carry out decoding tests, in the worst case, on four aggregates of four CCEs and where the MCS is signaled to the UE as being 1/6 the decoder only has to search 2 aggregates of 8 CCEs.

Similarly for the downlink control channel (for which the UE monitors 24 CCEs), then if the MCS is unknown the UE 3 may have to test up to eight aggregates of three CCEs assuming a coding rate of 2/3, four aggregates of six CCEs assuming a coding rate of 1/3, two aggregates of 12 CCEs assuming a coding rate of 1/6, and one aggregate of 24 CCEs assuming a coding rate of 1/12. In contrast where the MCS is signaled to the UE 3 as being 1/3, in the worst case the decoder 90 only has to search four aggregates of six CCEs and where the MCS is signaled to the UE as being 1/6, in the worst case the decoder only has to search 2 aggregates of 12 CCEs.

Signaling the MCS through a higher layer, the eNB MAC layer in this example, significantly reduces the number of decoding attempts. In contrast, blind decoding, given the possible number of attempts required by the UE to determine a control channel, would significantly complicate the UE design. Signaling the MCS whenever a change in MCS is needed is thus beneficial because it alleviates the complexity of blind decoding.

The MCS need only be signaled when it changes. Accordingly, where the UE 3 is stationary or moving at a slow speed while in LTE_Active state, the UE 3 will not require frequent updating and hence will not cause significant signaling overhead.

MODIFICATIONS AND ALTERNATIVES

It will be appreciated that the coding rates given above are only examples and that different coding rates may be used. Different modulation schemes than QPSK or BPSK may be used, where appropriate. Also, although the above embodiment uses the same modulation scheme (QPSK) for all MCS this need not necessarily be the case.

Although the number of communications regions given above is four, fewer or more communications regions may be used and different base stations may use different numbers of communications regions, depending upon the strength and/or reliability over the area of their cell of communication with UEs. As described above, a 2-bit code may be used to identify the MCS. It will be appreciated that more bits may be required to identify the MCS if there are more than four possible MCSs. The communications regions need not necessarily be circular or circular annuli as shown in FIG. 4.

The number of CCEs that a UE monitors for the uplink and/or the downlink control channel may be different from those given above.

It will be appreciated that the above embodiment has been described by way of example only and that equivalents not described above may also be employed without departing from the scope of the invention claimed. Also, modifications in addition to or in place of those discussed above may be made without departing from the scope of the invention claimed.

This application is based upon and claims the benefit of priority from UK patent application No. 0708456.9, filed on May 1, 2007, the disclosure of which is incorporated herein in its entirety by reference.

The invention claimed is:

1. A method of control channel communication within a cellular communications network, the method comprising:
   determining, within a cell of the cellular communications network, data which relates to a range of a user communications device and which is determined by a distance from a base station;
   selecting at least one of a plurality of modulation and coding schemes for a control channel for that communications device on a basis of the determined range data, the selected modulation and coding scheme being dependent on the distance between the user communications and the base station;
   separately identifying the selected modulation and coding scheme to the user communications device;
   providing a control channel for that user communications device using the selected modulation and coding scheme, by making the control channel correspond to an aggregation of control channel elements (CCEs) concerned with the selected modulation and coding scheme; and
   transmitting the aggregation of the CCEs to the user communications device.

2. A method according to claim 1, wherein the plurality of modulation and coding schemes each have a different coding rate,
   wherein the control channel is provided as the aggregation of the CCEs, each of the CCEs comprising a number of resource elements, and
   wherein a number of the CCEs in the control channel depending upon the selected modulation and coding scheme.

3. A communications device comprising:
   a determiner to determine data which relates to a range of a user communications device within a cell of a cellular network;
   a selector to select at least one of a plurality of modulation and coding schemes for a control channel for that user communications device on a basis of the determined range;
   an identifier to separately identify the selected modulation and coding scheme to the user communications device;
   a provider to provide a control channel for that user communications device using the selected modulation and coding scheme, by making the control channel correspond to an aggregation of control channel elements (CCEs) concerned with the selected modulation and coding scheme; and
   a transmitter to transmit the aggregation of the CCEs to the user communications device through the control channel.

4. A communications device according to claim 3, wherein the identifier is operable to identify the selected modulation and coding scheme to the user communications device using a higher communications protocol layer.

5. A communications device according to claim 3, wherein the plurality of modulation and coding schemes each have a different coding rate.

6. A communications device according to claim 3, wherein the provider is operable to provide the control channel as the aggregation of the CCEs, each of the CCEs comprising a number of resource elements, and
   wherein a number of the CCEs in the control channel depending upon the selected modulation and coding scheme.

7. A communications device according to claim 3, wherein the plurality of modulation and coding schemes each use a same modulation scheme.

8. A communications device according to claim 3, further comprising a receiver to receive an acknowledgement message indicating a receipt of the identity of the selected modulation and coding scheme by the user communications device.

9. A communications device according to claim 3, wherein the determiner is operable to determine data relating to the range of a user communications device within the cell of the communications device by determining which of a number of communications regions successively further from the communications device the user communications device is in.

10. A communications device according to claim 9, wherein each communications region is associated with a respective different one of the modulation and coding schemes.

11. A method of communicating in a cellular communications network, the method comprising a user communications device:
   receiving from a communications node identification data identifying which one of a plurality of modulation and coding schemes is selected for a control channel for the user communications device; and
   identifying the control channel using the received identification data identifying the one of the plurality of modulation and coding schemes selected for the control channel, by detecting an aggregation of control channel elements (CCEs) that is concerned with the selected modulation and coding scheme.

12. A method according to claim 11, which further comprises using the identification data to determine an aggregate number of the CCEs forming the control channel.

13. A user communications device for use in a cellular communications network, the user communications device comprising:
- a receiver to receive from a communications node identification data identifying one of a plurality of modulation and coding schemes selected for a control channel for the user communications device; and
- an identifier to identify the control channel using the received identification data identifying the one of the plurality of modulation and coding schemes selected for the control channel, by detecting an aggregation of control channel elements (CCEs) that is concerned with the selected modulation and coding scheme.

14. A user communications device according to claim 13, wherein the identifier is operable to use the identification data to determine an aggregate number of the CCEs forming the control channel.

15. A user communications device according to claim 13, further comprising an acknowledger to send an acknowledgement message upon receipt of the identification data.

16. A communications device according to claim 3, wherein the determiner is operable to determine the range of a user communications device on a basis of at least one of:
- an actual distance of the user communications device from the communications device;
- an average SNR (signal to noise ratio); and
- a channel quality indicator (CQI).

17. A non-transitory computer implementable instructions product comprising computer implementable instructions for programming a programmable computer device to carry out a method in accordance with claim 1.

18. A non-transitory computer implementable instructions product comprising computer implementable instructions for programming a programmable computer device to carry out a method in accordance with claim 11.

19. A user communications device according to claim 14, wherein the identifier is operable to monitor subsets of the CCEs on a basis of the aggregated number of CCEs determined from the received identification data in order to identify the control channel.

20. A user communications device according to claim 13, wherein the receiver is operable to receive respective identification data for uplink and downlink control channels.

* * * * *